(12) United States Patent
Paeng et al.

(10) Patent No.: US 7,251,325 B2
(45) Date of Patent: Jul. 31, 2007

(54) PUBLIC KEY CRYPTOSYSTEM USING FINITE NON ABELIAN GROUPS

(75) Inventors: Seong Hun Paeng, Daejon-Shi (KR); Kil Chan Ha, Daejon-Shi (KR); Jae Heon Kim, Daejon-Shi (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 687 days.

(21) Appl. No.: 10/483,187

(22) PCT Filed: Oct. 17, 2001

(86) PCT No.: PCT/KR01/01747

§ 371 (c)(1),
(2), (4) Date: Mar. 18, 2004

(87) PCT Pub. No.: WO03/007539

PCT Pub. Date: Jan. 23, 2003

(65) Prior Publication Data

US 2004/0156498 A1     Aug. 12, 2004

(30) Foreign Application Priority Data

Jul. 12, 2001   (KR) ............................... 2001-41839

(51) Int. Cl.
*H04K 1/00* (2006.01)
(52) U.S. Cl. .............................. 380/28; 380/29; 380/30; 380/44; 380/45; 380/282; 380/285; 380/286; 380/263; 708/492
(58) Field of Classification Search ................... 380/28
See application file for complete search history.

(56) References Cited

U.S. PATENT DOCUMENTS

| 5,740,250 A * | 4/1998 | Moh ............................ 380/28 |
| 6,038,317 A * | 3/2000 | Magliveras et al. .......... 380/28 |
| 6,493,449 B2 * | 12/2002 | Anshel et al. ................. 380/30 |
| 7,069,287 B2 * | 6/2006 | Paar et al. ................... 708/492 |

FOREIGN PATENT DOCUMENTS

EP    0 666 664    * 8/1995

OTHER PUBLICATIONS

T. Moh, "A public Key system With Signature And Master key Functions", Mathg Department, Purdue university, West lafayette, Indiana, received Apr. 1997.*

(Continued)

*Primary Examiner*—Taghi T. Arani
(74) *Attorney, Agent, or Firm*—Lowe Hauptman & Berber LLP (57) ABSTRACT

The present invention relates to a method of encryption and decryption comprises the steps of: selecting a generator and a first element of a first non abelian group, respectively, computing a first inner automorphism which is used as a first public key, and generating a second public key by using a secret key being a first integer and the first public key; expressing a plain text by a product of generator of a second non abelian group, computing a second inner automorphism by using an arbitrary second integer and the first public key, computing a third inner automorphism by using the second integer and the second public key, and generating a ciphertext by using the third inner automorphism; and generating a fourth inner automorphism by using the secret key and the second inner automorphism, and decrypting the ciphertext by using the fourth inner automorphism.

36 Claims, 3 Drawing Sheets

OTHER PUBLICATIONS

Anshel et al., "An Algebraic Method for Public_Key Cryptography", Mathematical Research, Letters 6, 1-5 (1999).*

Cooperman et al., "Computing With Matrix Groups using Permutation Representations", ACM Press, New York, NY, 1995, pp. 259-264.*

Vanston et al., "Factorization in the Elementary Abelian p-Group and Their Cryptographic Significance", Journal of Cryptography (1994) 7: 201-212.*

Ko et al., "New Public-Key Cryptosystem Using Braid Groups", CRYPOTO 2000, LNCS 1880, pp. 166-183, 2000.*

* cited by examiner

PUBLIC KEY CRYPTOSYSTEM USING FINITE NON ABELIAN GROUPS

This is a nationalization of PCT/KR01/01747 filed Oct. 17, 2001 and published in English.

BACKGROUND OF THE INVENTION

1. Technical Field

The present invention relates to a public key cryptosystem using finite non abelian groups and, in particular, to a method of generating finite non abelian groups, an implementation of efficient public key cryptosystem using the non abelian groups and an application method thereof.

2. Background Art

A conventional or symmetric cryptosystem is a system for encrypting and decrypting a document by using a secret key and has disadvantages that there is difficulty in administration of the secret key and a digital signature can not be appended to a message to be transmitted since each of users must have identical secret key.

A public key cryptosystem introduced by Diffie and Hellman in 1976 to provide a new adventure in modem cryptology is a system using a public key and a secret key, in which the public key is publicly known so as to be used by anyone and the secret key is kept by users so that non-public exchange of message is enabled between users having the public key.

Conventionally, RSA encryption scheme using difficult factorization problem of a composite number and ElGamal-type cryptosystem using Discrete Logarithm Problem (DLP) were used. Recently, a braid operation cryptosystem using difficult conjugacy problem in non abelian groups is developed. A public key cryptosystem using elliptic curve is disclosed in "Public key cryptosystem with an elliptic curve" of U.S. Pat. No. 5,272,755 registered on Dec. 21, 1993, and a braid operation cryptosystem using conjugacy problem is disclosed in "New public key cryptosystem using braid group" published on an article book of Advances in Cryptology Crypto 2000 by K. H. Ko, et al. on August 2000.

In case of using the Discrete Logarithm Problem such as ElGamal cipher in $Z_p$, the size of group and key is increased in finite field, which is an abelian group, due to the development of efficient algorithm such as index calculus. Therefore, to solve these problems, a public key cryptosystem must be suggested which can avoid the conventional algorithm for solving the Discrete Logarithm Problem and sufficiently stably maintain the group and key.

SUMMARY OF THE INVENTION

In addition, the problem in using the non abelian groups is that since if the representation of a given element is not pre-established, a plain text and a deciphertext may be recognized to be different, therefore, a selected arbitrary element must be represented in a given way of representation. Therefore, in a cryptosystem using non abelian groups, the problem of whether an arbitrary element can be efficiently represented in a given way of representation is very important.

Therefore, an object of the present invention is to provide a method of encrypting and decrypting a message using finite non abelian groups which can eliminate the disadvantages described above by using the Discrete Logarithm Problem using automorphism of finite non abelian groups.

An encryption/decryption process of the present invention comprises the steps of:

selecting a generator and a first element of a first non abelian group, respectively, computing a first inner automorphism which is used as a first public key, and generating a second public key by using a secret key being a first integer and the first public key;

expressing a plain text by a product of generator of a second non abelian group, computing a second inner automorphism by using an arbitrary second integer and the first public key, computing a third inner automorphism by using the second integer and the second public key, and generating a ciphertext by using the third inner autmorphism; and generating a fourth inner automorphism by using the secret key and the second inner automorphism, and decrypting the ciphertext by using the fourth inner automorphism.

A generalized encryption/decryption process of the present invention comprises the steps of:

selecting a first element of a first group, computing a first automorphism of a second group which is used as a first public key, and generating a second public key by using a secret key being a first integer and the first public key;

expressing a plain text by a product of generator of the second group, computing a second automorphism by using an arbitrary second integer and the first public key, computing a third automorphism by using the second integer and the second public key, and generating a ciphertext by using the third automorphim; and generating a fourth automorphism by using the secret key and the second automorphism by using the secret key and the second automorphism, and decrypting the ciphertext by using the fourth antomorphism.

A signature scheme of the present invention comprises the steps of:

selecting generators and an element of non abelian group, respectively, computing a first inner automorphism which is used as a first public key, and generating a second public key by using a secret key being an integer and the first public key;

computing a second inner automorphism by using the first public key and an arbitrary random number, generating a symmetric key by using the second inner automorphism, computing a ciphertext by encrypting a plain text containg an agreed upon type of redundancy by using the symmetric key, computing a hash function by using the ciphertext, and signing by using the random number and hash function; and checking whether the signature exists in a predetermined range, computing the hash function, computing a third inner automorphism by using the signature, the integer and the hash function, recovering the symmetric key by using the third inner automorphism, obtaining a deciphertext by using the symmetric key, and checking whether the signature is valid signature by checking an agreed upon redundancy in the deciphertext.

A method of key exchanging of the present invention comprises the steps of:

selecting generators and an element of non abelian group, respectively, and computing a first inner automorphism which is used as a first public key;

a first user computing a second inner automorphism by using an arbitrary first random number and the public key and providing the second inner automorphism to a second user;

the second user generating a symmetric key by computing a third inner automorphism by using an arbitrary second random number and the second inner automorphism; and the first user computing the third inner automorphism by using the fourth inner automorphism and the first random number, and obtaining the symmetric key by using the third inner automorphism.

BRIEF DESCRIPTION OF THE DRAWINGS

The above and other objects, effects, features and advantages of the present invention will become more apparent by describing in detail the preferred embodiment of the present invention with reference to the attached drawings in which.

Similar reference characters refer to similar parts in the several views of the drawings.

DETAILED DESCRIPTION OF THE INVENTION

A detailed description of the present invention is given below with reference to the accompany drawings.

FIGS. 1 to 5 are flow chart illustrating a public key cryptosystem using finite non abelian groups according to an embodiment of the present invention, where the contents in the square brackets relates to a cryptosystem of generalized finite non abelian groups which will be described later.

The present invention suggests a new encrypting method based on a special conjugacy problem and a Discrete Logarithm Problem. Let p be a big prime number, G be a non abelian group of which the number of central elements is not one, a first element g be an element of G, an order p and be not in the center of G, and $\{e_i\}$ be a generator set of G.

Here, when $Inn(g)(x)=gxg^{-1}$, if $\{Inn(g)(e_i)\}$ is known, an isomorphism $Inn(g)$ can be obtained. That is, if m is represented as $e_{j_1} \ldots e_{j_n}$, then $Inn(g)(m)=Inn(g)(e_{j_1}) \ldots Inn(g)(e_{j_n})$. Therefore, $Inn(g)$ can be represented as $\{Inn(g)(e_i)\}$.

Figure 1:
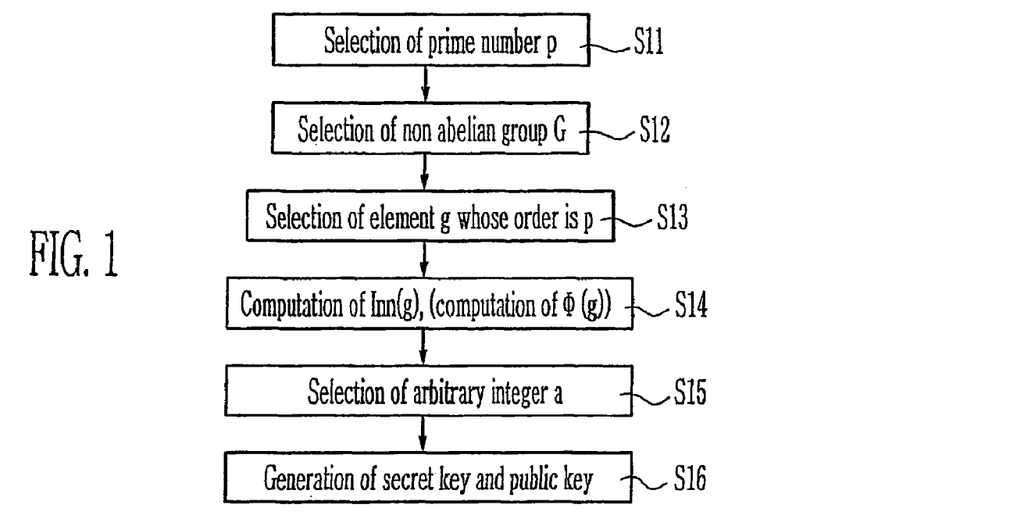
FIG. 1 is a flow chart illustrating a method of generating a public key using finite non abelian groups according to the present invention.

Then, the procedure of generating a public key used in encrypting a plain text M as shown in FIG. 1 is as follows.

The prime number p is selected (step S1) and the finite non abelian group G having the characteristics described above is selected (step S2). The generator $\{e_i\}$ of the element of the finite non abelian group G is selected, and the element g which is not a central element and has an order being a large prime number p is selected (step S3). Then, an inner automorphism $Inn(g)$ for g given above is computed by the following equation 1 (step S4).

$$Inn(g)=\{Inn(g)(e_i)\}=\{ge_ig^{-1}\} \quad (1)$$

Next, an arbitrary first integer a which is smaller than the prime number p is set as a secret key and the public key is set as $Inn(g^a)$ (referred to as "a second pubic key" herein below) using the inner automorphism $Inn(g)$ (referred to as "a first public key" herein below) and the secret key a (steps S5 and S6).

Figure 2:
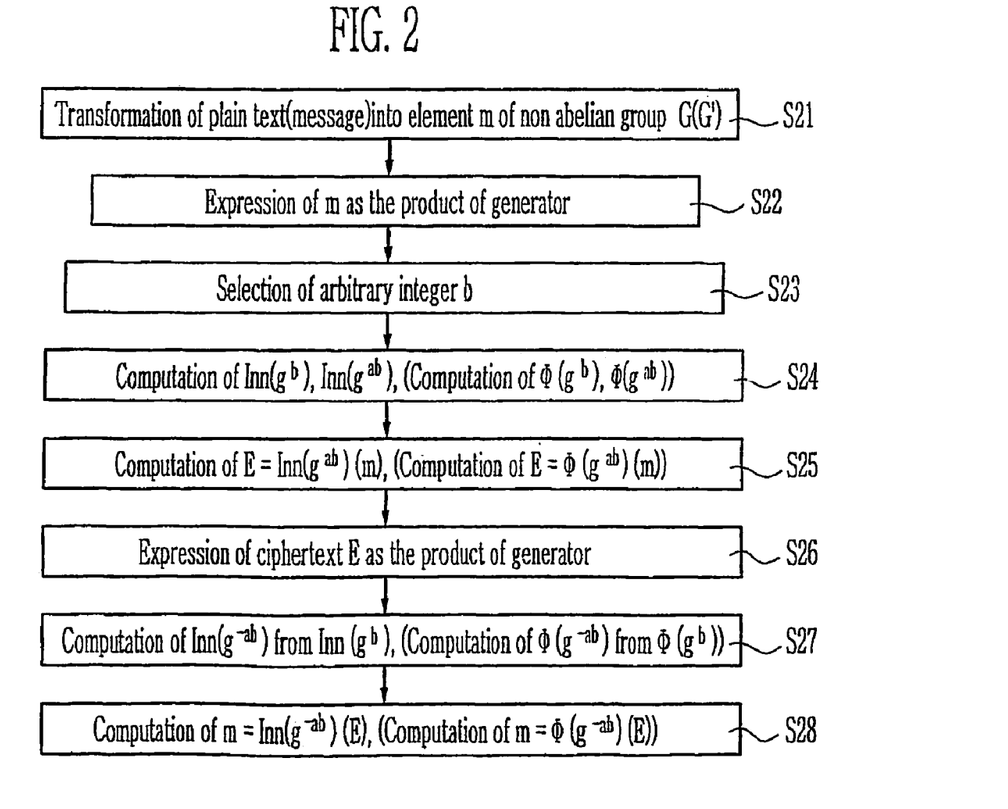
FIG. 2 is a flow chart illustrating a method of encrypting and decrypting a message using the public key shown in FIG. 1.

Next, the procedure of encrypting and decrypting the plain text M using the secret key and the public key is described below with reference to FIG. 2.

The plain text M is transformed to the element m of the non abelian group G (that is, $m \in G$), and the element m is represented as a product of the generator $\{e_i\}$ (steps S7 and S8). If an arbitrary second integer b is selected, a second inner automorphism $Inn(g^b)$ and a third inner automorphism $Inn(g^{ab})$ are computed respectively using the first public key and the second public key and b (steps S9 and S10). A ciphertext E is computed by an equation 2 given below by using the second inner automorphism $Inn(g^b)$ and the third inner automorphism $Inn(g^{ab})$ and transmitted to a receiver side (step S11). In addition, the second inner automorphism $Inn(g^b)$ is transmitted to the receiver side together with the ciphertext E.

$$E=Inn(g^{ab})(m)=(Inn(g^a)^b)(m) \quad (2)$$

The transmitted ciphertext E is decrypted as follows. The transmitted ciphertext E is expressed as a product of the generator (step S12).

Next, a fourth inner automorphism $Inn(g^{-ab})=Inn(g^b)^{-a}$ is computed using the secret key a and the second inner automorphism $Inn(g^b)$(step S13). If the computed value is used, since m is computed by equation 3, the decryption is effected (step S14).

$$m=Inn(g^{-ab})E \quad (3)$$

The non abelian G for implementation of the message encryption/decryption method described above can be generated by a semi-direct product by an equation 4.

$$G=SL(2, Z_p) \times_\theta Z_p \quad (4)$$

Here, $SL(2,Z_p)$ is a subgroup of the non abelian group G. A cyclic subgroup a having an order p of $SL(2, Z_p)$ exists in G, and $\theta$ is defined as equation 5.

$$\theta=Inn \circ \theta_1 : Z_p \rightarrow Aut(SL(2,Z_p)) \quad (5)$$

Here, $\theta_1$ is an isomorphism from $Z_p$ to the cyclic subgroup. Then $\theta(y)(x)=\theta_1(y)x\,\theta_1(y)^{-1}$. Using this equation, the conjugate of (a,b) is computed by equation 6. Here, let $g=(x,y)$.

$$(x,y)(a,b)(x,y)^{-1}=(x\theta(y)(a)\theta(b)(x^{-1}),b) \quad (6)$$

Here, fixing b=0, equation 7 can be obtained.

$$(x,y)(a,0)(x,y)^{-1}=(x\theta(y)(a)x^{-1},0)=((x\theta_1(y))a(x\theta_1(y))^{-1}, 0) \quad (7)$$

Here, if we solve the special conjugacy problem of $SL(2,Z_p)$, we can obtain $x\theta_1(y)$. The special conjugacy problem is a problem of obtaining x' which satisfies $Inn(x')=Inn(x)$ when $Inn(x)$ is given.

In addition, if we assume that $(x_1,y_1) \in G$ satisfies $x_1\theta_1(y_1)=x\theta_1(y)$, then for $b \neq 0$, we can easily obtain equation 8 by using the fact that $Z_p$ is an abelian group and $\theta_1$ is a homomorphism.

$$x_1\theta(y_1)(a)\theta_g(b)(x_1^{-1}) = x_1\theta_1(y_1)a\,\theta_1(y_1)^{-1}\theta_1(b)x_1^{-1}\theta_1(b)^{-1}$$
$$= (x_1\theta_1(y_1))a\,\theta_1(y_1)^{-1}\theta_1(b)\theta_1y_1\theta_1(y)^{-1}x^{-1}\theta_1(b)^{-1}$$
$$= (x\,\theta_1(y))a\,\theta_1(-y_1+b+y_1)\theta_1(y)^{-1}x^{-1}\theta_1(b)^{-1}$$

$$=x\theta_1(y)a\theta_1(b)\theta_1(y)^{-1}x^{-1}\theta_1(b)^{-1}$$

$$=x\theta_1(y)a\theta_1(y)^{-1}\theta_1(b)x^{-1}\theta_1(b)^{-1}$$

$$=x\theta(y)(a)\theta(b)(x^{-1}) \qquad (8)$$

That is, the set of solutions for the special conjugacy problem can be expressed as equation 9.

$$S=\mathrm{Inn}^{-1}(\mathrm{Inn}(g))=\{(x_1,y_1)|y_1\in Z_p, x_1=\pm x\theta_1(y-y_1)\} \qquad (9)$$

Here, the number |S| of elements of S is 2p.

If $\mathrm{Inn}(g)=\mathrm{Inn}(g_1)$, $\mathrm{Inn}(g^{-1}g_1)=\mathrm{Id}$. This means that $g^{-1}g_1$ is an element of the center of G. Also for any central element $g_o$, $\mathrm{Inn}(GG_0)=\mathrm{Inn}(g)$. So we know that the number of the central element of G is 2p.

Note that the probability to choose m and g in the center is $2p/p^3=1/p^2\approx 0$, $2p/p^4=2/p^3\approx 0$. In addition, m is chosen from $SL(2,Z_p)$ which is a subgroup of G.

If the non abelian group G is generated by equation 4, a generator set of $SL(2,Z_p)$ is $\{T, S\}$. This can be expressed as follows.

$$\left\{T=\begin{pmatrix}1&1\\0&1\end{pmatrix}, S=\begin{pmatrix}0&-1\\1&0\end{pmatrix}\right\}$$

There exists an algorithm which find a decomposition of each element $g \in SL(2,Z_p)$ of $SL(2,Z_p)$. That is, an arbitrary element g of $SL(2,Z_p)$ is computed by equation 10.

$$g=S^{i_0}T^{j_1}ST^{j_2}\ldots ST^{j_n}S^{i_{n+1}} \qquad (10)$$

Where $i_o$, $i_{n+1}$ may be '0' or '1' and $j_n=\pm 1, \pm 2, \ldots$.

If $m\in SL(2,Z_p)$, then m can be expressed as equation 11 (Herein below, referred to as "Theorem 1").

$$m=T^{j_1}ST^{j_2}ST^{j_3} \qquad (11)$$

To prove this, if we compute $T^{j_1}ST^{j_2}ST^{j_3}$, we obtain equation 12.

$$\begin{pmatrix}1&j_1\\0&1\end{pmatrix}\begin{pmatrix}0&-1\\1&0\end{pmatrix}\begin{pmatrix}1&j_2\\0&1\end{pmatrix}\begin{pmatrix}0&-1\\1&0\end{pmatrix}\begin{pmatrix}1&j_3\\0&1\end{pmatrix}= \qquad (12)$$
$$\begin{pmatrix}j_1j_2-1 & j_1j_2j_3-j_3-j_1\\ j_2 & j_2j_3-1\end{pmatrix}$$

From equation 12 and a fact that $Z_p$ is a field, we can find $j_1, j_2, j_3$ which satisfies $m=T^{j_1}ST^{j_2}ST^{j_3}$ for any given $m\in SL(2,Z_p)$. That is, if the three values $j_1, j_2, j_3$ are determined, all elements of $SL(2,Z_p)$ are determined.

Since $\{(T,0), (S,0),(I,1)\}$ is a generator set of G, if we know $gTg^{-1}$, $gSg^{-1}$ and $g(I,1)g^{-1}$, we can obtain $\mathrm{Inn}(g)$. In addition, since $m\in SL(2,Z_p)$ and $SL(2,Z_p)$ is a normal subgroup of G, $\mathrm{Inn}(g)$ can be restricted to $SL(2,Z_p)$ and $\mathrm{Inn}(g)|_{SL(2,Z_p)}$ becomes an automorphism of $SL(2,Z_p)$. Hence, the public key is $\mathrm{Inn}(g)|_{SL(2,Z_p)}$ and $\mathrm{Inn}(g^a)|_{SL(2,Z_p)}$. Therefore, if $\{gTg^{-1}, gSg^{-1}\}$ is known, we can express $\mathrm{Inn}(g)|_{SL(2,Z_p)}$.

We choose $\theta_1$ (1) among elements of $SL(2,Z_p)$ whose order is p, e.g. $I+\delta$ 12.

A method of choosing the element g of non abelian group G in $\mathrm{Inn}(g)$ is as follows.

For $(x,y)\in G$, $(x,y)^n=((x\theta_1(y))^n\theta_1(y)^{-n},ny)$ (Herein after referred to as "Theorem 2"). To prove this, an induction method and equation 13 below are used.

$$(x,y)^{k+1}=(x,y)^k(x,y)=((x\theta_1(y))^k\theta_1(b)^{-k},ky)(x,y)$$

$$=((x\theta_1(y))^k\theta_1(y)^{-k}\theta(y)^k(x),(k+1)y)$$

$$=((x\theta_1(y))^k\theta_1(y)^{-k}\theta_1(y)^k x\theta_1(y)^{-k},(k+1)y)$$

$$=((x\theta_1(y))^k(x\theta_1(y))\theta_1(y)^{-(k+1)},(k+1)y)$$

$$=((x\theta_1(y))^{k+1}\theta_1(y)^{-(k+1)},(k+1)y) \qquad (13)$$

Here, if we determine $x\theta_1(y)$ to be $A(I+c\delta_{12})A^{-1}$ for some fixed $c\in Z_p$ and $A\in SL(2,Z_p)$, then we can choose g whose order is p and we can know that the order of $\mathrm{Inn}(g)$ is p according to Theorem 2.

If we choose g arbitrarily and the order of g is not fixed, then we can increase the security since we should know the order of a given cyclic group to apply a known algorithm for Discrete Logarithm Problem (DLP). That is, we should solve DLP under the assumption that the order of g is p for each $d|(p+1)(p-1)$.

The present invention described above maintains the security since DLP can not be solved in $\mathrm{Inn}(g)$ easily. This will be described below in detail.

In case that we solve DLP to obtain the secret key a from the public key $\mathrm{Inn}(g)$ and $\mathrm{Inn}(g^a)$, it seems that the fastest algorithm (e.g., index calculus) to solve DLP can not be applied. So, if the order of g is p, then an expected run time for solving DLP is $O(\sqrt{P})$—group operations.

In addition, the second method of obtaining the secret key is as follows. The special conjugacy problem in G is not a hard problem and the DLP in G is not a hard problem too as seen in equation 14.

$$(x,y)^a=((x\theta_1(y))^n\theta_1(y)^{-n},ay)=(X,Y) \qquad (14)$$

We need to solve ay=Y for solving DLP for g and $g^a$. However, in case only $\mathrm{Inn}(g^a)$ is given, since the number of elements of $S=\{g_1|\mathrm{Inn}(g_1)=\mathrm{Inn}(g^a)\}$ is 2p, we need O(p) times of trials to find $g^a$ in S. So this method is less efficient than finding a from $\mathrm{Inn}(g)$ and $\mathrm{Inn}(g^a)$ directly.

If we choose 160-bit prime p, the security of the present invention becomes similar to 1024 bit RSA. (That is, an expected run time for solving DLP in $\mathrm{Inn}(g)$ and for factorization in 1024-bit RSA is about $2^{87}$ and $2^{80}$, respectively.) Also, $\mathrm{Inn}(g)$ is contained in $\mathrm{Aut}(G)\subset \mathrm{End}(G)\subset G^G$, where $\mathrm{End}(G)$ is the endomorphism group of G and $G^G$ is the set of all functions from G to G. We cannot apply the index calculus to any of them since they are not even expressed as matrix groups.

Here, if we compare the present invention with RSA and XTR, we can note that the present invention has the following advantage. That is, in RSA and XTR, an expected run time to find the secret key from the public key is sub-exponential, while an exponential run time $O\sqrt{p}$ is taken in the present invention.

Now, a method of calculating $\mathrm{Inn}(g^b)$ from $\mathrm{Inn}(g)$ will be described. The calculation of $\mathrm{Inn}(g^2)$ is as equations 15 and 16.

$$\mathrm{Inn}(g^2)(S)=\mathrm{Inn}(g)(T^{j_1}ST^{j_2}ST^{j_3})$$

$$=(\mathrm{Inn}(g)(T))^{j_1}(\mathrm{Inn}(g)(S))(\mathrm{Inn}(g)(T))^{j_2}(\mathrm{Inn}(g)(S))(\mathrm{Inn}(g)(T))^{j_3} \qquad (15)$$

$$\mathrm{Inn}(g^2)(T)=\mathrm{Inn}(g)(T^{i_1}ST^{i_2}ST^{i_3})$$

$$=(\mathrm{Inn}(g)(T))^{i_1}(\mathrm{Inn}(g)(S))(\mathrm{Inn}(g)(T))^{i_2}(\mathrm{Inn}(g)(S))(\mathrm{Inn}(g)(T))^{i_3} \qquad (16)$$

In addition, we can obtain $(Inn(g)(T))^j$ from $Inn(g)(T)$ using 4 times of multiplications by equation 17.

$$\text{If } Inn(g)(T) = \begin{pmatrix} x & y \\ z & w \end{pmatrix}, \quad (17)$$

$$\text{then } (Inn(g)(T))^j = \begin{pmatrix} 1-j(1-x) & jy \\ -jz & 1+j(w-1) \end{pmatrix}$$

It takes 92 multiplications for computing $Inn(g^2)(S)$ and $Inn(g^2)(T)$. So it takes about $92\log_2 p$ multiplications for computing $Inn(g^b)$ from $Inn(g)$ and it takes about $92\log_2 p$ multiplications for computing $Inn(g^{ab})$ from $Inn(g^a)$. So number of multiplications for encryption is $184\log_2 p$. Since one multiplication needs $0((\log_2 p)^2)$-bit operations, the encryption needs about $184(\log_2 p)^3 C \approx 8 \times 10^8 C$-bit operations for some constant C. In 1024-bit RSA, it takes $(\log_2 n)^3 C \approx (1024)^3 C \approx 10^9 C$-bit operations. If the public exponent in RSA encryption scheme is 32-bit number, then it takes $3.2 \times 10^7 C$-bit operations.

According to the present invention, a modification is possible to facilitate a fast encryption and decryption. This will be described in detail below.

For example, in case where 'A' want to send an encrypted message to 'B', 'A' computes $Inn(g^a)^b$ and $Inn(g^b)$ only at the first communication and send $Inn(g^b)$ to 'B'. 'B' computes $Inn(g^b)^{-a}$ by using the received $Inn(g^b)$. After 'A' encrypts a message m as a ciphertext $E=Inn(g^a)^b(m)$ for a fixed b after first communication of message m, 'A' sends the ciphertext E to 'B'. 'B' can decrypt E by computing $Inn(g^b)^{-a}(E)$.

That is, in order to compute $Inn(g^a)^b(m)$ from given $Inn(g^a)^b$ and m, it takes 46 multiplications so it takes about $1.2 \times 10^6 C$-bit operations in encryption. Even if 32-bit public exponent is used in RSA, $3.2 \times 10^7 C$-bit operations are needed in encryption. Encryption using the present invention is about 30 times faster than 1024-bit RSA.

In decryption, we need the same number of multiplications as the encryption. In decryption of RSA, it takes about $2.5 \times 10^8 C$-bit operations even if we use the "Chinese Remainder Theorem. Thus, the decryption according to the present invention is 200 times faster than that of RSA.

In ECC, since b is not fixed, precomputations of $g^b$ is impossible. Then, the number of multiplications for decryption in 170-bit ECC are 1900, respectively. Then, the decryption according to the present invention is about 40 times faster than ECC.

In addition, in ECC, it need $O(\log_2 p)$ multiplications in decryption, so the number of multiplications will increase linearly with respect to the number of bits $\log_2 p$. In contrast, the decryption of the present invention needs 46 multiplications independent of the size of p. Table 1 below shows comparison of decryption between the present invention and ECC.

TABLE 1

| | Public key cryptosystem of the present invention (r-bit) | r-bit ECC |
|---|---|---|
| r = 170 | 46 | 1900 |
| r = 240 | 46 | 2700 |
| r = 310 | 46 | 3500 |

Note that the cryptosystems in the same row have the roughly same securities.

Now, the present invention will be described in view of key expression and key size. In the present invention, since $Inn(g^a)(T)$ and $Inn(g^a)(S)$ can be considered as elements of $SL(2,Z_p)$, we can express them by three entries. Since $Inn(g^a)(T)$ can be expressed by $3\log_2 p$-bit, $6\log_2 p$-bit are needed to express $Inn(g^a)$, if p is a 160-bit prime number, then it takes 960-bit to express $Inn(g^a)$. So we can express the public key with smaller size than RSA. The secret key size is $\log_2 p \approx 160$-bit so it is much smaller than 1024-bit RSA.

The present invention described above provides a new public key cryptosystem using finite non abelian groups and suggests an example of finite non abelian groups which can be used in the encryption scheme described above. The encryption scheme described above can be applied to other non abelian groups. However, we must be careful in choosing the non abelian groups for the security of encryption.

That is, the existence of abelian normal subgroup which is not center reduces the security of the cryptosystems. So any abelian normal subgroup must be of small order, and the algorithm to express an element of G by a product of generators must be efficient. In addition, since $Inn(g)$ is expressed as $\{Inn(g)(e_i) \in G | e_i \text{ is a generator}\}$, the number of generators must be small.

Further, we can use other, homomorphisms from G to Aut(G) instead of the inner automorphism.

On the other hand, the public key described above is applicable to various fields such as digital signature, key exchange, etc,. The digital signature scheme and key exchange method using the public key cryptosystem will be described below.

Figure 3:
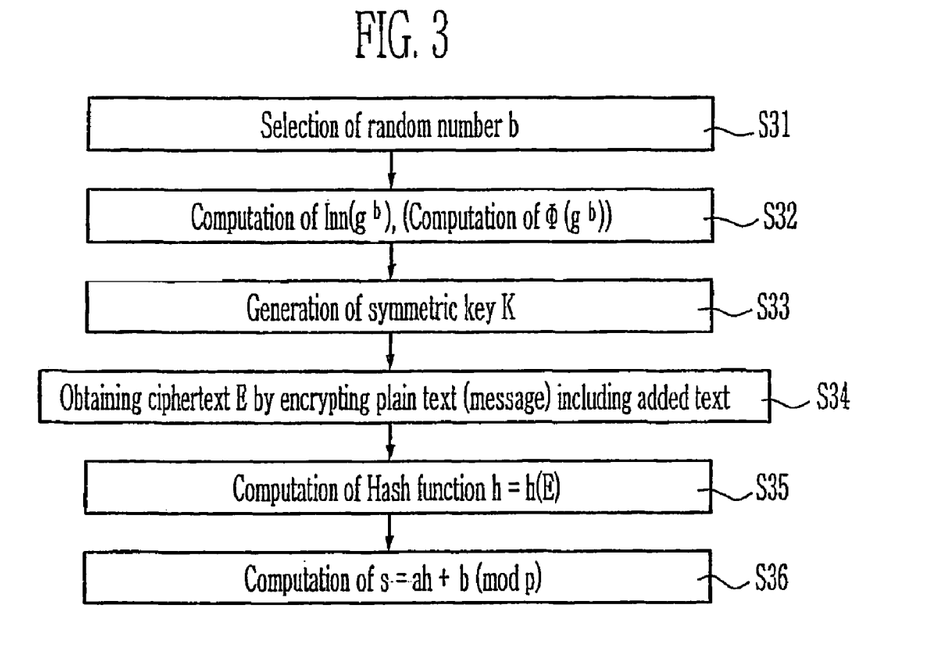
FIG. 3 is a flow chart illustrating an electronic signing method using the public key shown in FIG. 1.
Figure 4:
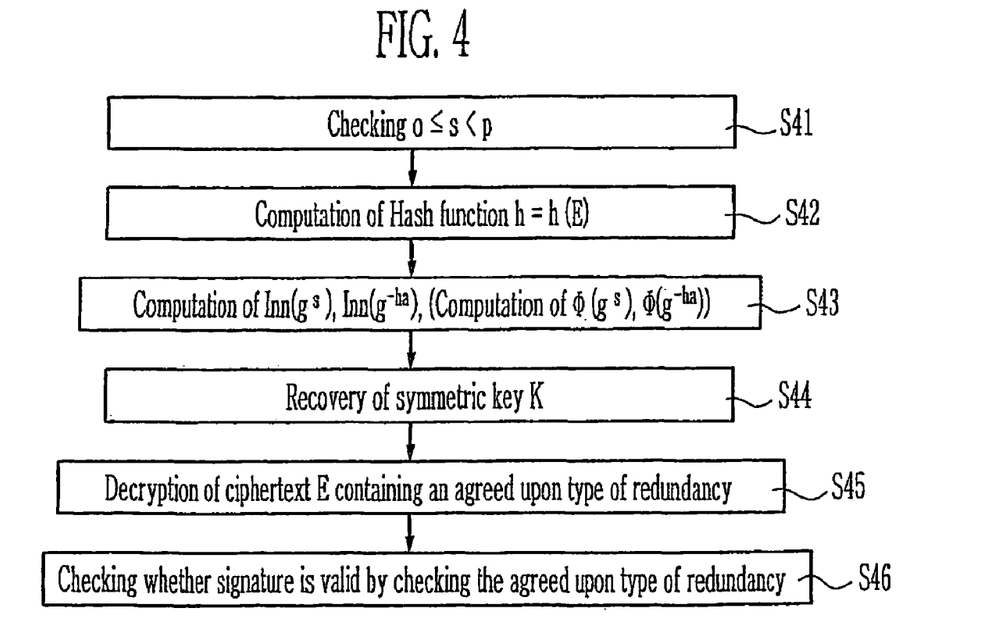
FIG. 4 is a flow chart illustrating a digital signature confirming method using the public key shown in FIG. 1.

A digital signature scheme using the public key cryptosystem is illustrated in FIGS. 3 and 4. For example, let us assume that 'A' signs while sending a plain text M to 'B'. The digital signature scheme is effected by using the public keys $Inn(g)$, $Inn(g^a)$ and the secret key a generated through the steps illustrated in FIG. 1. The singing procedure is as shown in FIG. 3.

'A' selects a random number b (an integer random sampled from arbitrary integer) (step S31) and then computes $Inn(g^b)$ by using the random number b (step S32). A symmetric key K is generated using the $Inn(g^b)$ (step S33), and a plain text (message) M containg an agreed upon type of redundancy is encrypted to obtain a ciphertext E by using the symmetric key K (step S34).

Next, a hash function $h=h(E)$ is computed by using the ciphertext E (step S35) and a signature s is computed by equation 18 (step S36).

$$s = ah + b \pmod{p} \quad (18)$$

'A' sends the ciphertext E and the signature s to 'B'.

A procedure of confirming the signature described above is as shown in FIG. 4. 'B' checks whether the transmitted signature s exists in a range of $0 \leq s < p$ (step S41). 'A' computes the hash function $h=h(E)$ (step S42) and computes $Inn(g^s) Inn(g^{-ha})$ (step S43). Next, the symmetric key K is recovered using the $Inn(g^s) Inn(g^{-ha})$ (step S44), and the ciphertext E containg an agreed upon type of redundancy is decrypted by using the symmetric key K and checks whether agreed is appropriate to check the validity of the signature (steps S45 and steps 46). If the signature is valid, the plain text (meesage) M is accepted as the valid message.

In the digital signature scheme, the encryption can be effected using $Inn(g^{ab})(m)$ instead of the symmetric key K.

Then, there is no problem in encryption and decryption using even with the random number b fixed.

Figure 5:
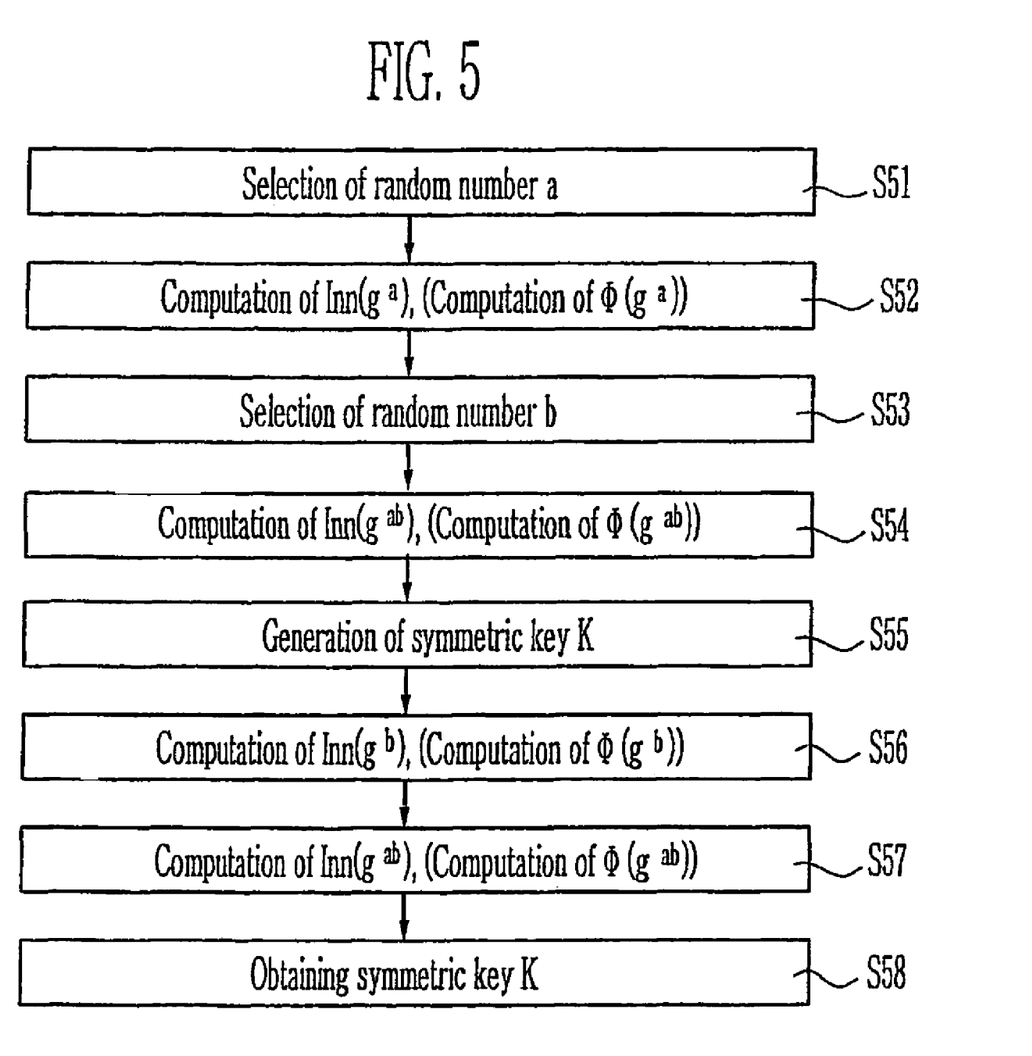
FIG. 5 is a flow chart illustrating a key exchanging method using the public key shown in FIG. 1.

A key exchange method using the public key cryptosystem described above is described in FIG. 5. For example, in case of exchanging keys between 'A' and 'B', the key exchange is effected using the public key Inn(g) generated through the steps illustrated in FIG. 1. Procedure of the key exchange is as shown in FIG. 5.

'A' selects the random number a (step S51), and then computes Inn($g^a$) using the random number a (step S52). Then, 'A' sends Inn($g^a$) to 'B'. 'B' selects the random number b (step S53), computes Inn($g^{ab}$) using the random number b (step S54), and generates the symmetric key K using the Inn($g^{ab}$) (step S55).

Next 'B' computes Inn($g^b$) and sends it to 'A' (step S56), and computes Inn($g^{ab}$) using Inn($g^b$) and the random number a (step S57). Then, 'A' obtains the symmetric key K from Inn ($g^{ab}$) (step 58).

The cryptosystem described above can be generalized as follows. The reason why the inner automorphism group is used is that although in general it is not easy to know the automorphism group, it is easy to know the inner automouphism group which is a subgroup of the automorphism group. However, if we know another subgroup of the automorphism group the generalization of the cryptosystem can be made. It can be described in detail as follows. When a homomorphism $\Phi:G \to Aut(G')$ for groups G and G' is given, the cryptosystem using the DLP in $\Phi$ (G) is made in the same way as the cryptosystem using the DLP in Inn(G). That is, $\Phi$ is applied instead of Inn which is used in the above description. In this case, the message m is selected from G', and E=$\Phi$ $(g)^{ab}$(m). The security in this case is closely related to the size of Ker($\Phi$) in the same way as that the security in case of using the inner automorphism group Inn(G) is closely related to the size of center which is Ker(Inn).

The generalized cryptosytem described above is a big system including ElGamal-type encryption. ElGamal-type is a special case described above when G=$Z_{p-1}$, G'=$Z_p$. We can consider the following example.

When $\theta_1: Z_m \to Z^*_1 = Aut(Z_1)$, $\theta_1(1)=\alpha$ and $(\alpha,m)=1$, we can make H=$Z_1 \times \theta_1 Z_m$. Here, let the order at $Z^*_1$ of a be $|\alpha|$. We can define an isomorphism which is $\theta_2: Z_n \to Aut(H)$, $\theta_2(1)(x,y)=(sx,ty)$ for s, t which satisfy (s, 1)=1, (t, m)=1, $|\alpha|t-1$, and then we can make a solvable group G=$(Z_1 \times \theta_1 Z_m) \times \theta_2 Z_n$ therefrom.

The basic system using the Discrete Logarithm in Inn(G) for G defined thus has a weak point due to the existence of abelian normal group. However, the weak point can be complemented by letting $\Phi = Inn \circ Inn: G \to Inn(Inn(G))$, G'=Inn(G), and using the generalized system. In addition, by solving the special conjugacy problem of G, an element of arbitrary Inn(G) can be easily expressed by a product of generators.

Since the special conjugacy problem of G is easily solved by taking |t| and |s| sufficiently small, an arbitrary element can be easily expressed by a product of generators. In addition, when $r_1=|\alpha|$, we select $r_1$, m, t which satisfy 1 cm(m/t-1, $r_1$)>>m/t-1.

The present invention described above can provide the following effects by using the Discrete Logarithm Problem in the inner automorphism of finite non abelian groups.

First, the application of exponential run time algorithm to solve the DLP quickly can be avoided, second, the security can be maintained without depending on the DLP by using non abelian groups which have large centers, third, the high speed of encryption/decryption can be achieved since there is no necessity of encrypting by generating different random numbers each time of encrypting the message by applying the deformed ElGamal method, and fourth, the public key encrypting method can be easily used to the signature different from the situation in which there was difficulty when the public key encryption method using the existing non abelian groups is used in signature.

Since those having ordinary knowledge and skill in the art of the present invention will recognize additional modifications and applications within the scope thereof, the present invention is not limited to the embodiments and drawings described above.

What is claimed is:

1. A method of encryption and decryption of public key cryptosystem using finite non abelian groups, comprising the steps of:

selecting a first generator and a first element of a first non abelian group, respectively, computing a first inner automorphism which is used as a first public key, and generating a second public key by using a secret key being a first integer and said first public key;

expressing a plain text by a product of a second generator of a second non abelian group, computing a second inner automorphism by using an arbitrary second integer and said first public key, computing a third inner automorphism by using said second integer and said second public key, and generating a ciphertext by using said third inner automorphism; and generating a fourth inner automorphism by using said secret key and said second inner automorphism, and decrypting said ciphertext by using said fourth inner automorphism.

2. The method of claim 1, wherein said first non abelian group G is expressed as following equation;

$$G = SL(2, Z_p) \times_\theta Z_p$$

Where $SL(2,Z_p)$ is a non abelian group, and $\theta$ is a homomorphism to automorphism group of $SL(2,Z_p)$ at $Z_p$.

3. The method of claim 1, wherein said second non abelian group is identical to said first non abelian group or is a partial set of said first non abelian group.

4. The method of claim 1, wherein said second non abelian group is expressed as $SL(2,Z_p)$.

5. The method of claim 1, wherein said first element is not a central element of said first non abelian group but a prime number having a large order.

6. The method of claim 1, wherein said first inner automorphism Inn(g) is computed by following equation;

$$Inn(g) = \{Inn(g)(T) = gTg^{-1}, Inn(g)(S) = gSg^{-1}\}$$

Where T and S are generators of said second non abelian group SL(2, $Z_p$), and g is said first element.

7. The method of claim 1, wherein said secret key is a first integer smaller than a predetermined prime number.

8. The method of claim 1, wherein said second element m is expressed as the product of generators T and S as expressed by following equation;

$$m = T^{j_1} S T^{j_2} S T^{j_3}$$

Where $J_n = \pm 1, \pm 2 \ldots$, and n is an integer, and $$\left\{ T = \begin{pmatrix} 1 & 1 \\ 0 & 1 \end{pmatrix}, S = \begin{pmatrix} 0 & -1 \\ 1 & 0 \end{pmatrix} \right\}.$$

9. The method of claim 8, wherein if an inner automorphism Inn(g)(T) of said generator T is expressed as equation A, Inn(g)($T^j$) is calculated by equation B;

$$Inn(g)(T) = \begin{pmatrix} x & y \\ z & w \end{pmatrix} \quad (A)$$

$$(Inn(g)(T))^j = \begin{pmatrix} 1-j(1-x) & jy \\ -jz & 1+j(w-1) \end{pmatrix} \quad (B)$$

where j is an integer.

10. The method of claim 1, wherein said second integer b varies, whenever said ciphertext E is generated, so as to enable high speed encryption and decryption.

11. The method of claim 1, wherein said second integer b is fixed, whenever said ciphertext E is generated, so as to enable high speed encryption and decryption.

12. The method of claim 1, wherein said third inner automorphism is expressed as Inn($g^b$).

13. The method of claim 1, wherein said third inner automorphism is expressed as Inn($g^{ab}$).

14. The method of claim 1, wherein said ciphertext E is computed by following equation;

$$E=Inn(g^{ab})(m)=(Inn(g^a)^b)(m)$$

Where Inn($g^{ab}$) is said third inner automorphism and m is said second element.

15. The method of claim 1, wherein said fourth inner automorphism is expressed as following equation;

$$Inn(g^{-ab})=(Inn(g^b))^{-a}$$

where Inn($g^b$) is said second inner automorphism, and a is said first integer.

16. The method of claim 1, wherein said ciphertext is decrypted by following equation;

$$m=Inn(g^{-ab})(E)$$

Where m is said second element and Inn($g^{-ab}$) is said fourth inner automorphism.

17. A signature scheme in a public key cryptosystem using finite non abelian groups, comprising the steps of:

selecting generators and an element of non abelian group, respectively, computing a first inner automorphism which is used as a first public key, and generating a second public key by using a secret key being an integer and said first public key;

computing a second inner automorphism by using said first public key and an arbitrary random number, generating a symmetric key by using said second inner automorphism, computing a ciphertext by encrypting a plain text containing an agreed upon type of redundancy by using said symmetric key, computing a hash function by using said ciphertext, and signing by using said random number and hash function; and checking whether said signature exists in a predetermined range, computing said hash function, computing a third inner automorphism by using said signature, said integer and said hash function, recovering said symmetric key by using said third inner automorphism, obtaining a deciphertext by using said symmetric key, and checking whether said signature is valid signature by checking an agreed upon redundancy in the deciphertext.

18. The method of claim 17, wherein said non abelian group G is expressed as following equation;

$$G=SL(2, Z_p)x_\theta Z_p$$

Where SL(2,$Z_p$) is a non abelian group, and θ0 is a homomorphism to automorphism group of SL(2, $Z_p$) at $Z_p$.

19. The method of claim 17, wherein said element is not a central element of said non abelian group but a prime number having a large order.

20. The method of claim 17, wherein said first inner automorphism Inn(g) is computed by following equation;

$$Inn(g)=\{Inn(g)(T)=gTg^{-1}, Inn(g)(S)=gSg^{-1}\}$$

Where T and S are generators of said non abelian group SL(2, $Z_p$), and g is said element.

21. The method of claim 17, wherein said second inner automorphism is expressed as Inn($g^b$), and b is a random number.

22. The method of claim 17, wherein said hash function h goes from SL(2, $Z_p$) to $Z_p$ as shown in following equation, and SL(2, $Z_p$) is a non abelian group;

$$h=h(E)$$

Where E is a ciphertext.

23. The method of claim 17, wherein said signature s is computed by following equation;

$$s=ah+b \pmod{p}$$

Where a is a secret key, h is a hash function, b is a random number, and p is a prime number.

24. The method of claim 17, wherein said signature exists in the range of 0≦s<p.

25. The method of claim 17, said third inner automorphism is expressed as Inn($g^s$) Inn($g^{-ha}$), and a is a secret key and h is a hash function.

26. A method of key exchanging in a public key cryptosystem using finite non abelian groups, comprising the steps of:

selecting generators and an element of non abelian group, respectively, and computing a first inner automorphism which is used as a first public key;

a first user computing a second inner automorphism by using an arbitrary first random number and said public key and providing said second inner automorphism to a second user;

said second user generating a symmetric key by computing a third inner automorphism by using an arbitrary second random number and said second inner automorphism; and said first user computing said third inner automorphism by using said fourth inner automorphism and said first random number, and obtaining said symmetric key by using said third inner automorphism.

27. The method of claim 26, wherein said non abelian group G is expressed as following equation;

$$G=SL(2, Z_p)x_\theta Z_p$$

Where SL(2, $Z_p$) is a non abelian group, and θ0 is a homomorphism to automorphism group of SL(2, $Z_p$) at $Z_p$.

28. The method of claim 26, wherein said element is not a central element of said first non abelian group but a prime number having a large order.

29. The method of claim 26, wherein said first inner automorphism Inn(g) is computed by following equation;

$$Inn(g)=\{Inn(g)(T)=gTg^{-1}, Inn(g)(S)=gSg^{-1}\}$$

Where T and S are generators of said non abelian group SL(2, $Z_p$), and g is said element.

30. The method of claim 26, wherein said second inner automorphism is expressed as Inn($g^a$), and a is first random number.

31. The method of claim 26, wherein said third inner automorphism is expressed as Inn($g^{ab}$), and a is first random number and b is second random number.

32. The method of claim 26, wherein said fourth inner automorphism is expressed as Inn($g^b$), and b is second random number.

33. A method of encryption and decryption of public key cryptosystem using finite non abelian groups, comprising the steps of:

selecting a first element of a first group, computing a first automorphism of a second group which is used as a first public key, and generating a second public key by using a secret key being a first integer and said first public key;

expressing a plain text by a product of generator of said second group, computing a second automorphism by using an arbitrary second integer and said first public key, computing a third automorphism by using said second integer and said second public key, and generating a ciphertext by using said third automorphism; and generating a fourth automorphism by using said secret key and said second automorphism by using said secret key and said second automorphism, and decrypting said ciphertext by using said fourth antomorphism.

34. The method of claim 33, wherein said first group G is expressed as following equation;

$$G = (Z_1 x_{\theta 1} Z_m) x_{\theta 2} Z_n$$

Where homomorphism which is $\theta_1: Z_m \to Z^*_1 = \text{Aut}(Z_1)$, $\theta_1(1) = \alpha$, $(\alpha, m) = 1$ and homomorphism which is $\theta_2: Z_n \to \text{Aut}(H)$, $\theta_2(1)(x, y) = (sx, ty)$ about s, t satisfying $(s, 1) = 1$, $(t, m) = 1$, $|\alpha| | t-1$.

35. The method of claim 34, wherein when $r_1 = |\alpha|$ in equation 21, $r_1$, m and t satisfying 1 cm(m/t–1, $r_1$)>>m/t–1 are selected to raise the stability, and |s| and |t| are selected to be small to make the special conjugacy problem of G to be easily solved, so that element of Inn(G) can be easily expressed as the product of generator.

36. The method of claim 33, wherein said second group is expressed as Inn(G).

* * * * *